United States Patent [19]
Yamada et al.

[11] Patent Number: 6,144,743
[45] Date of Patent: Nov. 7, 2000

[54] INFORMATION RECORDING MEDIUM, RECORDING APPARATUS, INFORMATION TRANSMISSION SYSTEM, AND DECRYPTION APPARATUS

[75] Inventors: Hisashi Yamada, Yokohama; Hideo Ando, Tokyo, both of Japan

[73] Assignee: Kabushiki Kaisha Toshiba, Kawasaki, Japan

[21] Appl. No.: 09/019,586

[22] Filed: Feb. 6, 1998

[30] Foreign Application Priority Data

Feb. 7, 1997 [JP] Japan ................................. 9-025303

[51] Int. Cl.[7] .............................. G06F 17/60; H04L 9/00
[52] U.S. Cl. .................................. 380/44; 705/1; 705/18; 705/44; 705/405; 380/42
[58] Field of Search ................................. 380/16, 24, 25, 380/30, 28, 49, 44, 45, 51, 10, 20, 52; 705/1, 26, 30, 34, 35, 39, 40, 42, 44, 405, 18

[56] References Cited

U.S. PATENT DOCUMENTS

| | | | |
|---|---|---|---|
| 4,599,647 | 7/1986 | George et al. | 380/10 |
| 4,817,140 | 3/1989 | Chandra et al. | 380/4 |
| 4,916,738 | 4/1990 | Chandra et al. | 380/25 |
| 5,144,665 | 9/1992 | Takaragi et al. | 380/30 |
| 5,241,599 | 8/1993 | Bellovin et al. | 380/21 |
| 5,307,411 | 4/1994 | Anvret et al. | 380/25 |
| 5,321,752 | 6/1994 | Iwamura et al. | 380/24 |
| 5,502,765 | 3/1996 | Ishiguro et al. | 380/24 |
| 5,751,805 | 5/1998 | Otsuki et al. | 380/4 |

FOREIGN PATENT DOCUMENTS

| | | | |
|---|---|---|---|
| 539726 | 6/1994 | European Pat. Off. | H04L 9/08 |
| 539727 | 6/1994 | European Pat. Off. | H04L 9/00 |

OTHER PUBLICATIONS

Castelluccio, "Home Invasion", Management Accounting Journal, v80 n1, pp. 52–58, ISSN:0025–1690, Jul. 1998.

Copyright Act: Safety Net or "Overraction"?, Video Store journal, v20 n44, pp. 1–2, ISSN: 0195–1750, Nov. 1998.

"Kentucky Company finds easy money on Internet", Newsbytes News Network Journal, Dec. 1995.

Caruso, "Photo DC spec takes shape", Digital Media, v1 n5, pp. 18(3), ISSN: 1056–7038, Oc. 1991.

Trask, "DVD–Audio to get content protection", Pro Sound News Europe trade magazine, v14 n4, pp. 26(1), ISSN: 0025–1690, Jul. 1998.

James Kobielus, "Buyer's guide, gotcha!", from Network World Journal, p. 46, (or Dialog Classic file 674), Sep. 1996.

*Primary Examiner*—James P. Trammell
*Assistant Examiner*—Cuong H. Nguyen
*Attorney, Agent, or Firm*—Pillsbury Madison & Sutro Intellectual Property

[57] ABSTRACT

In the invention, an information recording medium records encrypted information, encrypted key information obtained by encrypting key information for decrypting the encrypted information to obtain original information, and non-encrypted condition information used upon decrypting the encrypted information and recorded in the encrypted key information, and the encrypted information from the information recording medium is decrypted inside an IC card using the encrypted key information and condition information. Upon decrypting the encrypted information from the information recording medium, information that requires security protection or copyright protection can be prevented from being illicitly copied.

1 Claim, 14 Drawing Sheets

INFORMATION RECORDING MEDIUM, RECORDING APPARATUS, INFORMATION TRANSMISSION SYSTEM, AND DECRYPTION APPARATUS

BACKGROUND OF THE INVENTION

The present invention relates to an information recording medium on which encrypted information and encrypted key information obtained by encrypting key information used for decrypting the encrypted information to restore original information, a recording apparatus for the information recording medium, an information transmission system for transmitting information from the information recording medium to another device to decrypt the information, and a decryption apparatus for decrypting the encrypted information using the encrypted key information to obtain original information.

At present, we can get information worldwide via the Internet. Recently, some charging systems for information services within specific domains (regions, areas) have been put into practice. Along with the penetration of the Internet into our society, it is of urgent necessity to assure security for the purpose of preventing unauthorized use.

Objectives of security include:

A) to specify each user who is entitled to the service the provider intends to provide, and prevent eavesdroppers from connecting themselves to the information transmission path and stealing service information (information steal protection); and B) to prevent a third party other than the service provider from using original service information for other commercial purposes, which is a violation of the copyright (information copy protection).

Especially, demands associated with information copy protection described in (B) are expected to increase rapidly in the future, since network computers are being enthusiastically developed.

The network computer under development has no HDD and downloads even an OS from a host server via radio upon startup. At the network computer, the user executes his or her jobs while installing required functional programs via radio when he or she requires application software programs.

Hence, conventionally, the user purchases various application package software programs and installs them in an hard disk device ("HDD") so as to use these programs.

However, when the user uses the network computer, he or she need not purchase such programs in advance; the user uses a required functional program by downloading it when he or she wants to use it. In this case, the user is charged each time he or she downloads the functional program. The functional program is not a large-size program unlike a package program but is a function-limited, very small-size program described in, e.g., JAVA™.

Hence, when the user uses the network computer, the functional program must be prevented from being copied and re-used by the user in terms of the above-mentioned specific charging method.

As the methods of providing security, the following three methods using asymmetric or two-key encryption are known.

1. The user issues a public key and secret key, and transmits the public key to an information service provider together with an information service request.
2. The information service provider encrypts service information on the basis of the public key sent from the user, and sends it to the user.
3. The user decrypts the encrypted information using the secret key issued by himself or herself, and uses the service information.

However, when these methods are used, the information service provider must encrypt information every time it receives user's request, resulting in very high service cost.

To avoid such problem, the following method may be used. That is, symmetric or single-key encryption using a common key common to encryption and decryption is adopted, the encrypted common key is sent to the user together with encrypted service information, and only the user who knows the common key can decrypt the encrypted information.

However, this method has the following problems.

a] If the user copies the service information to an HDD or optical disk, he or she cannot be charged for each information service provided.

b] As long as the common key is used, a third party other than the information service provider can easily illicitly use the encrypted information for commercial purposes.

In the above description, information services using a network computer have been mainly described. Likewise, services using satellite broadcast are also available. When broadcast is used, an asymmetric cryptosystem (a method using a public key and secret key) cannot be used. So, a symmetric cryptosystem using a public key is adopted, so that only a specific user who knows the public key can receive services.

However, in this case as well, problems [a] and [b] mentioned above commonly recur.

The above-mentioned problems will be elaborated in terms of the encryption technique.

As is conventionally known, the common key (symmetric) scheme in which the source and destination use an identical key suffer the following three shortcomings.

1) The key may be illicitly copied by a third party during its transfer.
2) Key management is complicated.
3) The destination user can easily alter encrypted data itself. More specifically, after the destination user decrypts the encrypted data using the common key and alters it, he or she can easily encrypt the data using the common key again.

By contrast, the asymmetric scheme using a public key and secret key can solve the above-mentioned problems but suffers the following shortcomings.

I] Encryption/decryption is time intensive.

II] The information service provider must inquire public keys of a CA center (authentication center) in units of users every time the provider sends information to the users.

These shortcomings make the load on the information service provider heavier.

Also, this system poses the following problem.

III] The system heavily loads the user in terms of the custody of the secret key.

For example, if the secret key is stolen, it becomes impossible to assure security. Also, since the user can easily copy an FD or IC card that stores the secret key, the copied key information may be illicitly used.

As a method of solving the above-mentioned problems, a hybrid system for encrypting data itself using a common key and encrypting only the common key using a public key has been proposed. This method can relax "[I] increase in encryption/decryption time" but cannot reduce the complexity of [II] and [III].

In a system for encrypting information and transmitting or recording the encrypted information, when a key used upon encrypting the information is also transmitted or recorded, the key used in encryption is not directly transmitted or recorded to make the key secret, but is transmitted or recorded as key information which is independently encrypted using an encryption means different from that for the information. On the information reproduction side, using the key obtained by decrypting the key information by a decryption means for the key, the encrypted information is decrypted using a decryption means for the information.

Using this system, a method of preventing reproduction control information from being altered by including the reproduction control information in the key before encryption is proposed.

However, with this method, the information reproduction side must decrypt the key information to know the reproduction control information, and this entails a serious problem in case of the following information reproduction system.

For example, an information reproduction system in which a disk drive device, which has neither decryption means for key information nor decryption means for encrypted information and merely reads recorded data, is made to determine reproduction inhibition information so as to control data transfer to an information reproduction apparatus with the decryption means will be described below.

In this case, the disk drive device must have the decryption means for key information, resulting in high cost of the disk drive device. Furthermore, security of the whole system may lower since the disk drive device must have the decryption means for the key information which is not originally required for the disk drive device.

BRIEF SUMMARY OF THE INVENTION

It is an object of the present invention to attain low-cost information delivery since a host server need not encrypt information upon receipt of each user's request.

It is another object of the present invention to greatly improve security since an illicit copy of information can be very easily found.

It is still another object of the present invention to remove the shortcomings of the common key system since the key can be prevented from being illicitly copied by a third party during its transfer, the key can be easily managed, and the destination user can hardly alter encrypted data.

It is still another object of the present invention to provide the following improvements as compared to the asymmetric scheme.

Both the information service provider and user can encrypt/decrypt within a relatively short period of time.

Since the information service provider need only set a master key alone, and need not inquire public keys of a management center in units of users, the information provision efficiency to the users can be greatly improved.

The information service provider records information encrypted in advance in an IC card, and can deliver it directly. For this reason, the load on the information service provider can be greatly lightened as compared to conventional encryption that encrypts information upon receipt of each user's request, and delivers the encrypted information.

Preparation for decryption can be done by only a conventional authentication procedure using an IC card, i.e., by inputting a user's password for personal authentication. Hence, the encryption technique can be adopted without imposing any extra loads on the user to assure security.

Since control information of encrypted information includes device information and region information, the user cannot copy the encrypted information to an HDD or optical disk and cannot illicitly use it.

As a result, all the shortcomings of the conventional encryption technique can be removed, processing at both the information source and destination can be greatly simplified, and the security function can be guaranteed.

To achieve the above object, the present invention provides an information recording medium comprising which records:

encrypted information; and encrypted key information obtained by encrypting key information for decrypting the encrypted information to obtain original information, wherein non-encrypted condition information used upon decrypting the encrypted information is recorded in the encrypted key information.

The present invention also provides a recording apparatus comprising:

setting means for setting encrypted key draft information and condition information used upon decryption;

first generation means for generating encrypted key information on the basis of the encrypted key draft information and the condition information which is not encrypted;

recording means for recording common key information;

second generation means for generating key information by decrypting the encrypted key information generated by the first generation means using the common key information recorded in the recording means;

input means for inputting information to be encrypted;

third generation means for generating encrypted information by encrypting the information to be encrypted input by the input means using the key information generated by the second generation means; and recording means for recording the encrypted key information including the condition information generated by the first generation means and the encrypted information generated by the third generation means on an information recording medium in correspondence with each other.

The present invention further provides an information transmission system, which comprises a first apparatus having an information recording medium that records encrypted information, and encrypted key information obtained by encrypting key information for decrypting the encrypted information to obtain original information, and a second apparatus which is connected to the first apparatus via a communication line and receives the encrypted information and encrypted key information transmitted from the information recording medium of the first apparatus, wherein non-encrypted condition information used upon decrypting the encrypted information is recorded in the encrypted key information recorded on the information recording medium of the first apparatus, the first apparatus comprises:

transmission means for transmitting the encrypted key information including the condition information and the encrypted information recorded on the information recording medium to the second apparatus, the second apparatus comprises:

first output means for outputting the condition information, encrypted key information, and encrypted information received from the first apparatus to a processing medium for performing decryption; and execution means for executing processing in accordance with decrypted information from the processing medium, and the processing medium comprises:

determination means for determining based on the condition information from the second apparatus if decryption is granted;

decryption means for, when the determination means determines that decryption is granted, decrypting the encrypted information on the basis of the encrypted key information from the second apparatus; and second output means for outputting the information decrypted by the decryption means to the second apparatus.

The present invention further provides a decipher apparatus that processes encrypted information, and encrypted key information obtained by encrypting key information for decrypting the encrypted information to obtain original information, comprising:

recording means which records second specific information generated based on first specific information and common key information;

setting means for setting the first specific information;

generation means for generating the common key information on the basis of the first specific information set by the setting means and the second specific information recorded on the recording means;

first decryption means for obtaining key information by decrypting the encrypted key information using the common key information generated by the generation means; and second decryption means for obtaining information before encryption by decrypting the encrypted information using the key information obtained by the first decryption means.

The present invention further provides a decipher apparatus of a portable medium that processes encrypted information, and encrypted key information obtained by encrypting key information for decrypting the encrypted information to obtain original information, comprising:

an input unit at which first specific information and common key information are input;

first generation means for generating second specific information on the basis of the first specific information and the common key information input at the input unit;

recording means for recording the second specific information generated by the first generation means;

inhibition means for inhibiting input from the input unit after recording on the recording means;

setting means for setting the first specific information;

second generation means for generating the common key information on the basis of the first specific information set by the setting means and second specific information recorded on the recording means;

first decryption means for obtaining key information by decrypting the encrypted key information using the common key information generated by the second generation means; and second decryption means for obtaining information before encryption by decrypting the encrypted information using the key information obtained by the first decryption means.

The present invention further provides a decipher apparatus that processes encrypted information, and encrypted key information including condition information used upon decrypting the encrypted information and obtained by encrypting key information for decrypting the encrypted information to obtain original information, comprising:

recording means which records second specific information generated based on first specific information and common key information;

setting means for setting the first specific information;

generation means for generating the common key information on the basis of the first specific information set by the setting means and the second specific information recorded on the recording means;

first decryption means for obtaining key information by decrypting the encrypted key information using the common key information generated by the generation means;

second decryption means for obtaining information before encryption by decrypting the encrypted information using the key information obtained by the first decryption means;

determination means for determining based on the condition information if decryption is granted; and control means for controlling execution of decryption by the first and second decryption means on the basis of the determination result of the determination means.

Additional object and advantages of the invention will be set forth in the description which follows, and in part will be obvious from the description, or may be learned by practice of the invention. The object and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

The first embodiment of the present invention will be described hereinafter with reference to the accompanying drawings.

Figure 1:
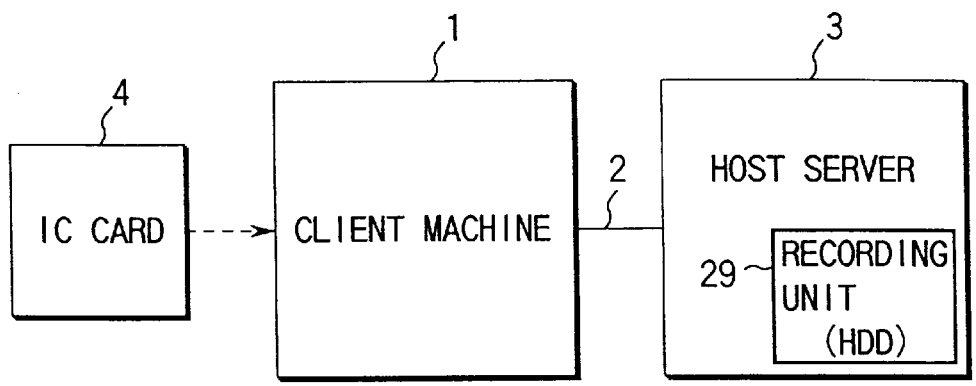
FIG. 1 is a schematic diagram showing the arrangement of an information transmission system used for explaining an embodiment of the present invention.

FIG. 1 shows an information transmission system of the present invention. The information transmission system is constituted by a client machine 1, a host server 3 connected to the client machine 1 via a communication line 2, and an IC card 4 as a decipher unit, which is loaded or built in the client machine 1.

More specifically, the client machine 1 transmits a transfer request for a program such as wordprocessing software as predetermined data to the host server 3. In response to this transfer request, the host server 3 sends back an encrypted program (encrypted information) such as wordprocessing software recorded in a hard disk device (HDD) 29 as a recording unit (to be described later) to the client machine 1 that issued the transfer request together with encrypted key information (encrypted information for decryption). In response to the sent-back information, the client machine 1 decrypts (breaks) the encrypted information using the encrypted key information using the IC card 4, and can perform processing using the decrypted program such as wordprocessing software.

The hard disk device (HDD) 29 records service information to be provided to the users. The service information includes not only specific data but also small-unit functional programs described in, e.g., a programming language (JAVA).

An example of the format of one service information recorded in the hard disk device (HDD) 29 will be explained below with reference to FIG. 2.

More specifically, information containing an encrypted program (information used by the user) 40 such as wordprocessing software as encrypted information and encrypted key information 41 used for decrypting (breaking) the encrypted information 40 is recorded.

The encrypted key information 41 includes non-encrypted control information 42 (that can be read without decryption). The control information 42 is condition information upon decrypting (breaking) the corresponding encrypted information 40.

Figure 3:
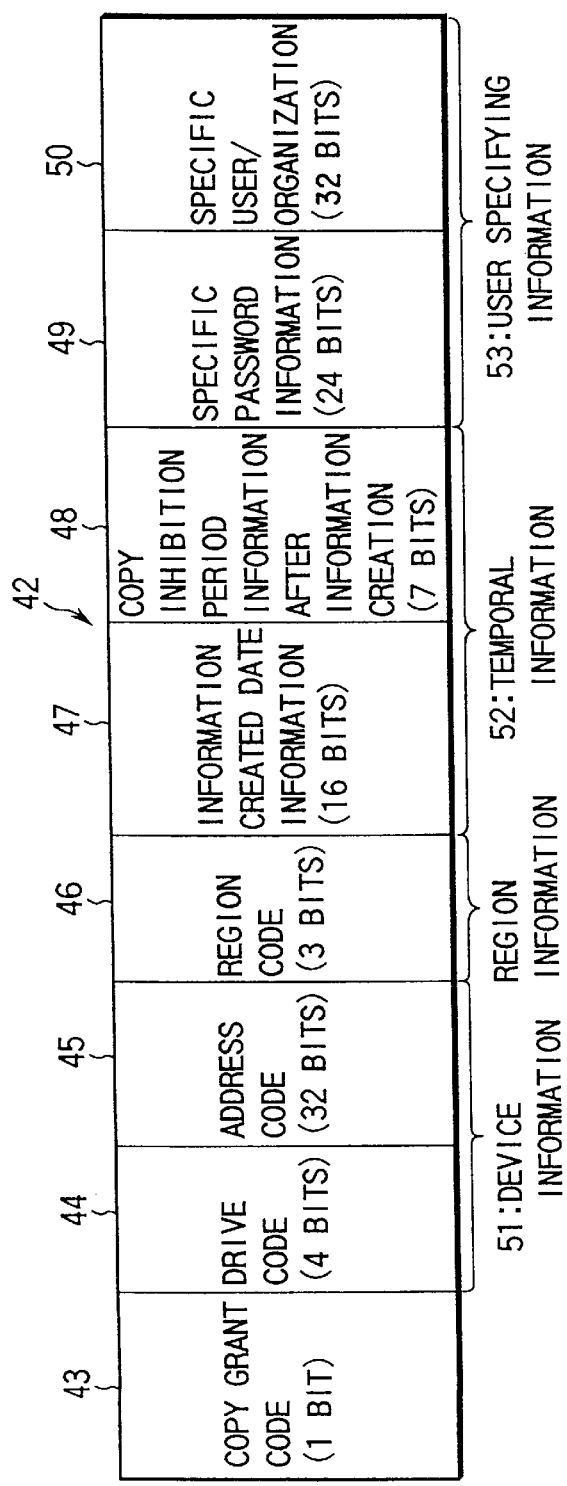
FIG. 3 shows an example of the format of control information.

As shown in FIG. 3, the control information 42 consists of 119 bits, i.e., a 1-bit copy grant code 43, a 4-bit drive code 44, a 32-bit address code 45, a 3-bit region code 46, 16-bit information created date information 47, 7-bit copy inhibition period information 48 after information creation, 24-bit specific password information 49, and 32-bit specific user/organization information 50.

The drive code 44 and address code 45 are called device information 51. The region code 46 is called region information. The information created date information 47 and copy inhibition period information 48 are called temporal information 52. The specific password information 49 and specific user/organization information 50 are called user specifying information 53.

The copy grant code 43 indicates copy grant or denial: if the code 43 is "1", it indicates copy grant; if the code 43 is "0", it indicates copy denial.

The drive code 44 indicates the information transmission path or drive used.

If the code 44 is "1H (hexa; hexadecimal notation)", it indicates that the information transmission path corresponds to an ISDN (LAN network) up to 10 MHz.

If the code 44 is "2H", it indicates that the information transmission path corresponds to an ISDN (LAN network) up to 100 MHz.

If the code 44 is "3H", it indicates that the information transmission path corresponds to an ISDN (LAN network) up to 500 MHz.

If the code 44 is "4H", it indicates that the information transmission path is a public telephone line (using a modem).

If the code 44 is "5H", it indicates that the information transmission path is a ground wave (multiplexed TV channel).

If the code 44 is "6H", it indicates that the information transmission path is satellite broadcast.

If the code 44 is "7H", it indicates that the information transmission path is a radio communication (PHS, cordless phone network).

If the code 44 is "8H", it indicates that the information transmission path is a local radio communication (intra-home communication, intra-office communication).

If the code 44 is "9H", it indicates that the information transmission path is a cable network. If the code 44 is "AH", it indicates that the information transmission path (drive used) is an FDD.

If the code 44 is "CH", it indicates that the information transmission path (drive used) is a boot HDD (that stores an operating system used upon startup).

If the code 44 is "DH", it indicates that the information transmission path (drive used) is an optical disk such as an MO, PD, or the like.

If the code 44 is "EH", it indicates that the information transmission path (drive used) is a CD-ROM or CD-R.

If the code 44 is "FH", it indicates that the information transmission path (drive used) is a DVD video or DVD-ROM.

If the code 44 is "0H", it indicates that the information transmission path (drive used) is a DVD-RAM or DVD-R.

The address code 45 indicates address data (IP address) for identifying the destination or source, and consists of, e.g., a network address and host address. This address code 45 is given when information is sent via the ISDN (LAN network).

The region code 46 is one of numbers 1H to 8H in hexadecimal notation assigned to eight divided regions on the Earth. The region code 46 corresponds to region information.

The information created date information 47 indicates the information created date, and is described by 7-bit year information, 4-bit month information, and 5-bit day information.

The copy inhibition period information 48 indicates a copy inhibition period, i.e., a copy denial period, and is given when the copy grant code is "0" indicating copy denial. This copy inhibition period information 48 can describe a maximum of 10 years 7 months=127 months, and if the code is "0000000", it indicates permanent copy denial.

The specific password information 49 indicates a specific password represented by four characters including English letters and numerals, and each character can be selected from 36 different characters. In this case, each character is described by a 6-bit code.

The specific user/organization information 50 indicates a specific user or organization.

The contents of the control information 42 may be simplified depending on the information contents to be processed by the information transmission system. For example, in the simplest system, the control information 42 may consist of a 1-bit copy grant code 43 alone.

Figure 2:
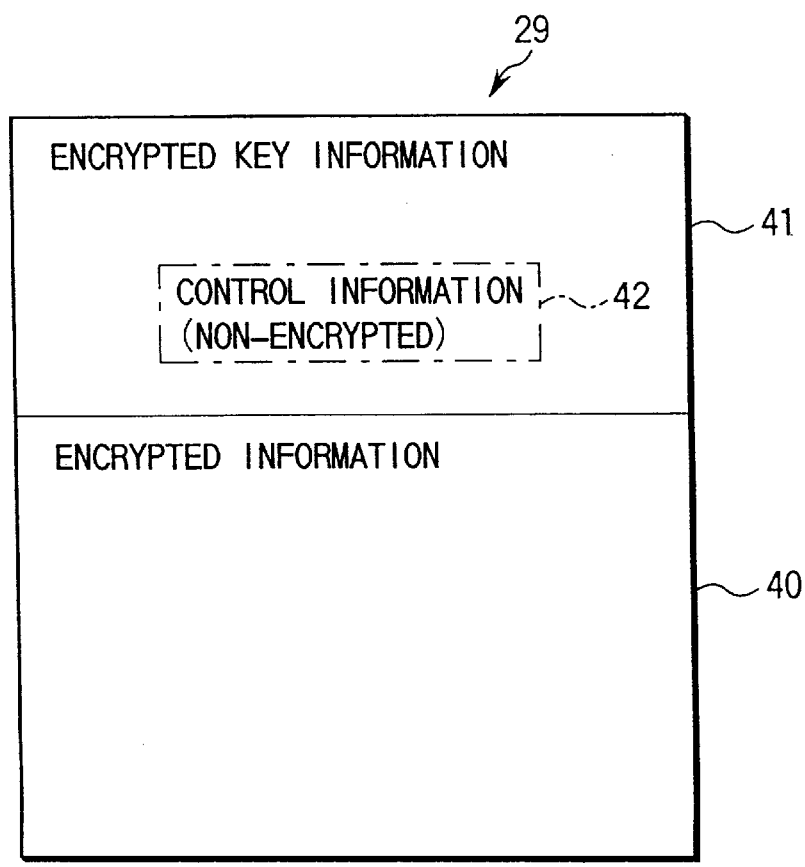
FIG. 2 shows an example of the format of service information.

The control information 42 having the format shown in FIG. 3 is encapsulated in the encrypted key information 41 shown in FIG. 2 without any encryption. The size of the encrypted key information 41 is larger than that of the control information 42. In order to prevent a hacker from breaking the encrypted key information 41, the encrypted key information 41 requires a size at least twice that of the control information 42, and preferably, three times or more.

Hence, when the control information 42 has the 119-bit configuration, the encrypted key information 41 requires at least 238 bits, normally, 357 bits or more.

When the control information 42 consists of the 1-bit copy grant code 43 alone, the encrypted key information 41 requires at least 2 bits, normally, 3 bits or more.

Figure 4:
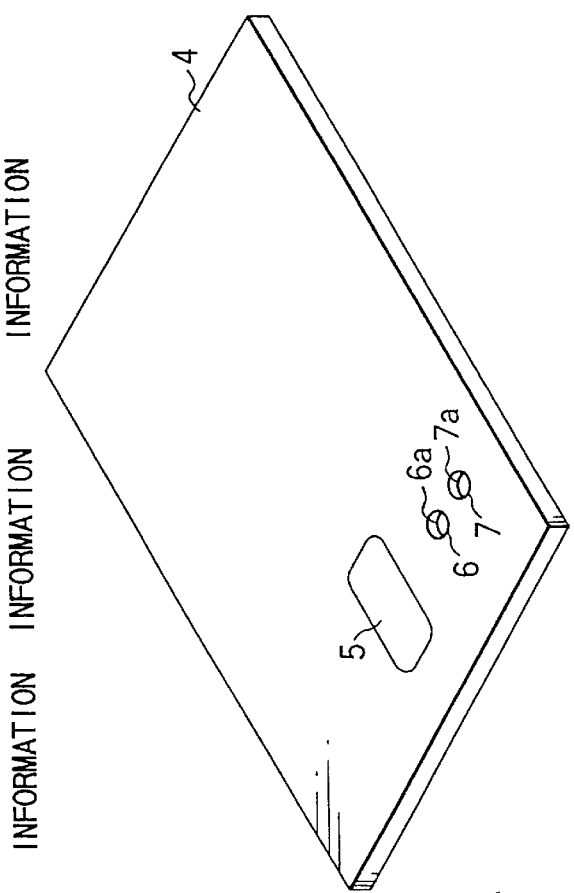
FIG. 4 is a perspective view showing the arrangement of an IC card shown in FIG. 1.

As shown in FIG. 4, the IC card 4 has an electrode portion 5 as a connect portion to be connected to an IC card reader/writer 13 (to be described later), a user password input terminal hole 6, and a master key input terminal hole 7. A user password input terminal 6a is present inside the user password input terminal hole 6, and a master key input terminal 7a is present inside the master key input terminal hole 7.

The user password input terminal hole 6 and master key input terminal hole 7 are filled up with a resin or the like after user corresponding key information (second specific information) is generated by inputting a user password (first specific information) and master key information (common key information) when the IC card 4 is issued by an issuance device, and is recorded on an EEPROM 34 (to be described later). With this structure, the user corresponding key information cannot be changed later, i.e., cannot be deliberately altered.

More specifically, after the user corresponding key information as the second specific information is formed by inputting the user password as the first specific information and the master key by the user, i.e., the provider as an issuer of the IC card 4, an external input route to those input portions (input terminals) is cut off to prevent alteration.

In place of filling up the user password input terminal hole 6 and master key input terminal hole 7, the user password input terminal 6a and master key input terminal 7a themselves may be removed or their electrode portions may be removed to prevent the user corresponding key information from being altered at a later time. In this case, lead lines may be used instead of the input terminals, and may be removed upon issuance.

Figure 5:
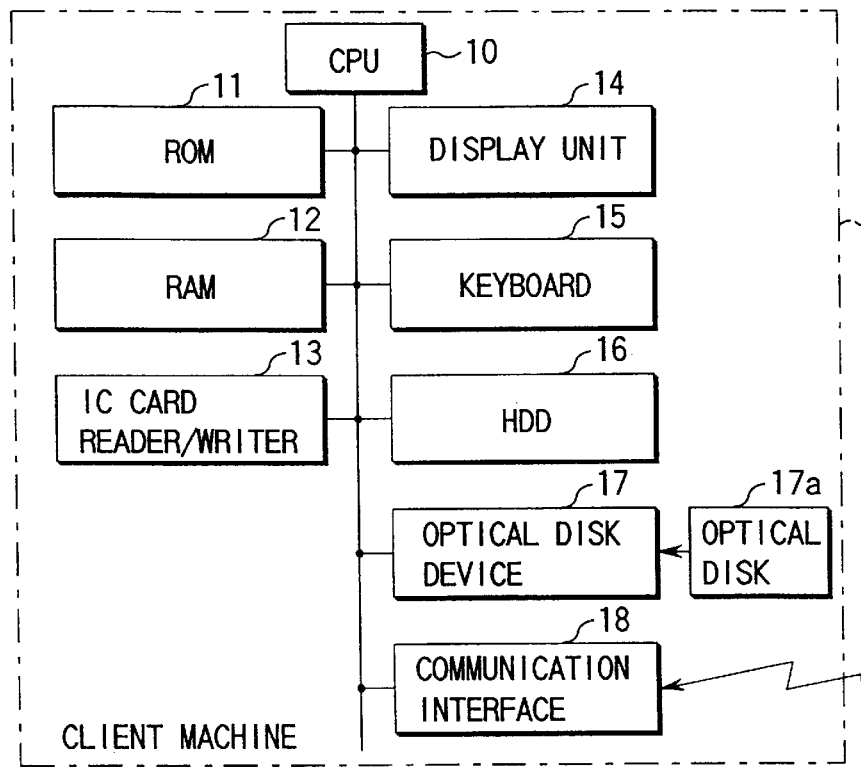
FIG. 5 is a schematic block diagram showing the arrangement of a client machine shown in FIG. 1.

The client machine 1 is an information processing apparatus such as a personal computer, and comprises a CPU 10 for controlling the overall client machine 1, a ROM 11 that records control programs, a RAM 12 for data recording, the IC card reader/writer 13 for exchanging data with the above-mentioned IC card 4, a display unit 14, a keyboard 15 as an input unit, a hard disk device (HDD) 16 as a recording unit (information recording medium), an optical disk device 17 as a recording unit that receives an optical disk 17a, and a communication interface 18 connected to the host server 3 via the communication line 2, as shown in FIG. 5.

The hard disk device (HDD) 16 and the optical disk device 17 can be connected later as optional devices.

Figure 6:
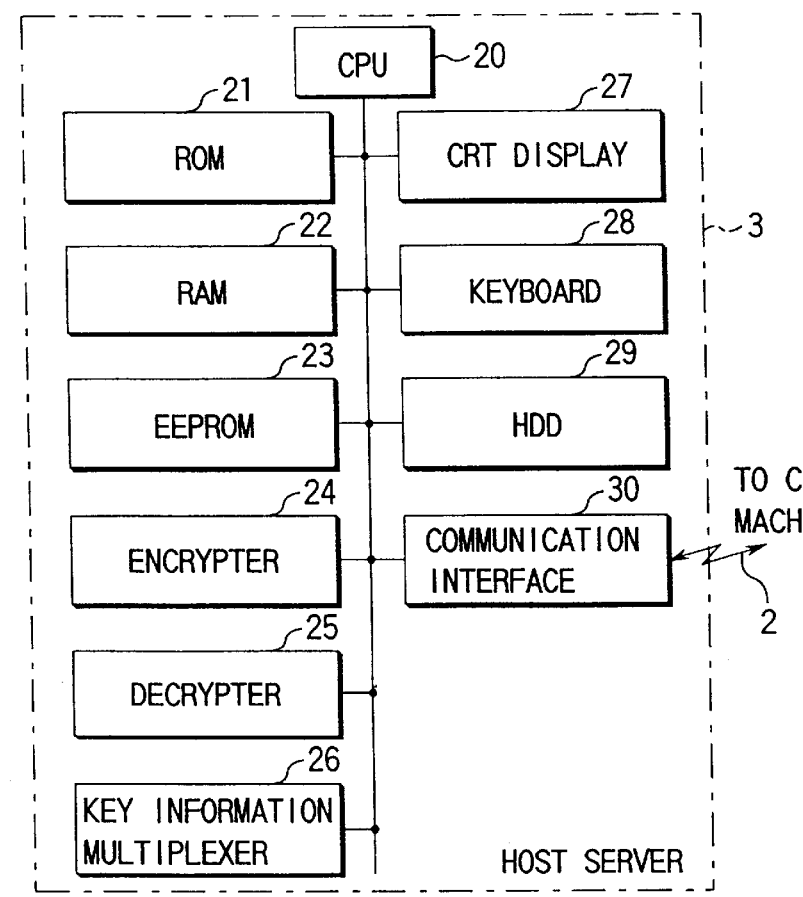
FIG. 6 is a schematic block diagram showing the arrangement of a host server shown in FIG. 1.

As shown in FIG. 6, the host server 3 comprises a CPU 20 for controlling the entire host server 3, a ROM 21 that records control programs, a RAM 22 for data recording, an EEPROM 23 which records master key information in advance, an encrypter 24 for encrypting raw information to obtain the encrypted information 40 using key information, a decrypter 25 for decrypting the encrypted key information 41 using the master key information to obtain key information, a key information multiplexer 26 for generating the encrypted key information 41, a CRT display 27 as a display unit, a keyboard 28 as an input unit at which the user inputs a user password, a hard disk device (HDD) 29 as a recording unit (information recording medium) which records information consisting of an encrypted program (encrypted information) such as wordprocessing program, and encrypted key information corresponding to that encrypted information, and a communication interface 30 connected to the client machine 1 via the communication line 2.

In place of the hard disk device (HDD) 29, an optical disk device may be used. If a larger-capacity recording unit is required, a disk array such as a RAID (redundant arrays inexpensive disk) or the like may be used.

Figure 7:
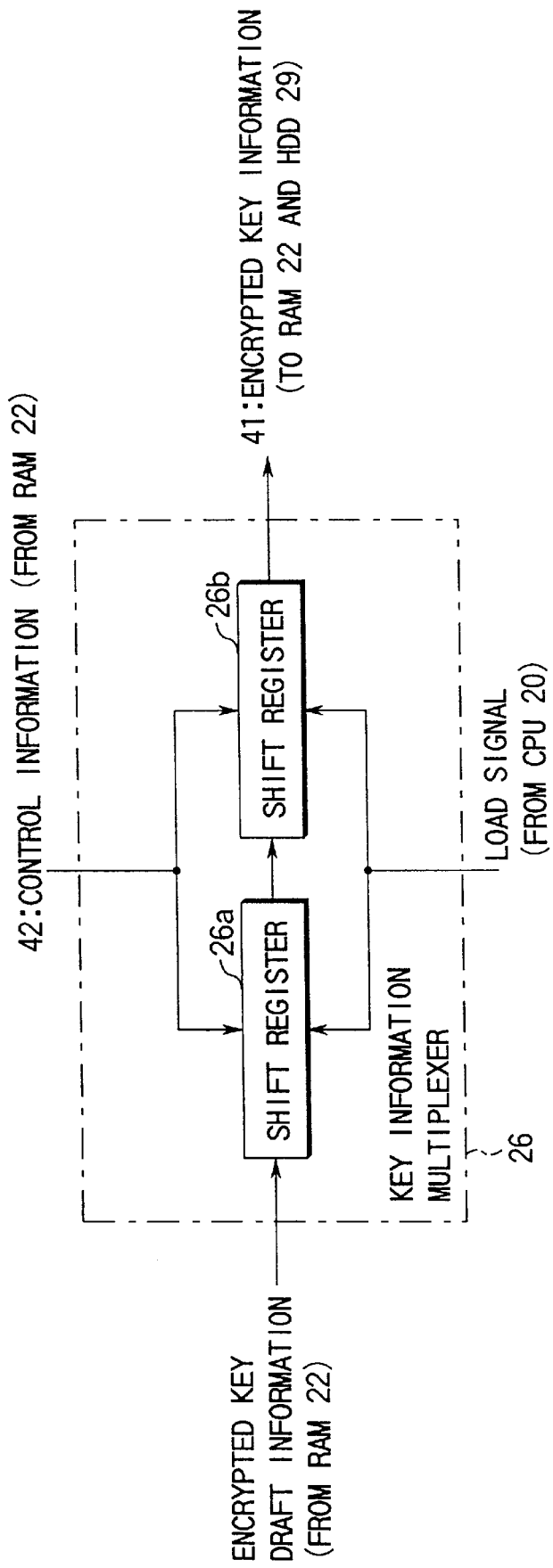
FIG. 7 is a schematic block diagram showing the arrangement of a key information multiplexer shown in FIG. 6.

The key information multiplexer 26 multiplexes encrypted key draft information as a temporary encrypted key and the control information 42 to generate the encrypted key information 41 as a mixing result, and comprises, e.g., two shift registers 26a and 26b, as shown in FIG. 7.

The shift registers 26a and 26b sequentially output supplied encrypted key draft information, and load the control information 41 upon reception of a load signal supplied from the CPU 20, thus encapsulating the control information 41 in the encrypted key draft information and outputting the obtained information. In this case, the CPU 20 outputs the load signal on the basis of the address of the encrypted key draft information read out from the RAM 22.

Figure 8:
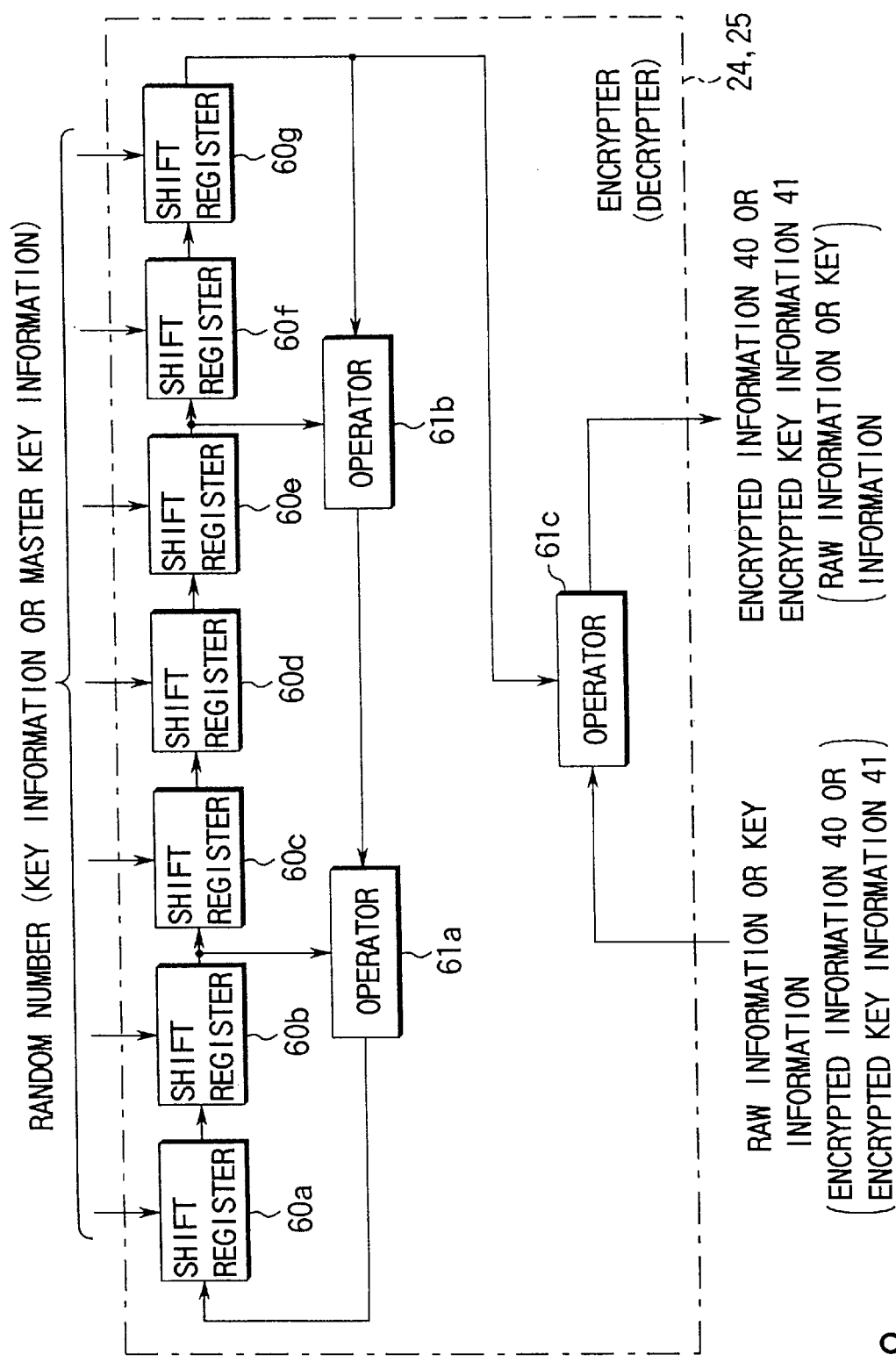
FIG. 8 is a schematic block diagram showing the arrangement of an encrypter and decrypter shown in FIG. 6.

Each of the encrypter 24 and decrypter 25 comprises seven shift registers 60a to 60g, and three operators 61a to 61c for operating exclusive ORs, as shown in FIG. 8.

In case of the encrypter 24, for example, when key information "1010010001011" as a random number is supplied to the shift registers 60a to 60g, and raw information "1110001110001", is supplied to the operator 61c, the operator 61c outputs encrypted information "1011100000101" as the encryption result.

In case of the decrypter 25, for example, when master key information "110100000110" as a random number is supplied to the shift registers 60a to 60g, and encrypted key information "1000011100101" is supplied to the operator 61c, the operator 61c outputs key information "1010010001011" as decrypted information, i.e., the decryption result.

Note that the keyboard 28 is used as the input unit used for inputting the user password. A voiceprint may be used instead of the user password, and a microphone and a voiceprint feature detector may be used as the input unit. On the other hand, facial information may be used instead of the user password, and a face image reader comprising a CCD and the like, and a facial information feature extractor may be used as the input unit. Furthermore, in place of key input of the user password, speech recognition of the user password may be used, and a microphone and speech recognition apparatus may be used as the input device. Moreover, a fingerprint may be used in place of the user password, and a fingerprint reader comprising a CCD and the like, and an image feature extractor may be used as the input unit. In addition, finger information may be used in place of the user password, and finger surface resistance measurement device at individual points using an electrode array, and a finger information feature extractor may be used as the input unit.

Figure 9:
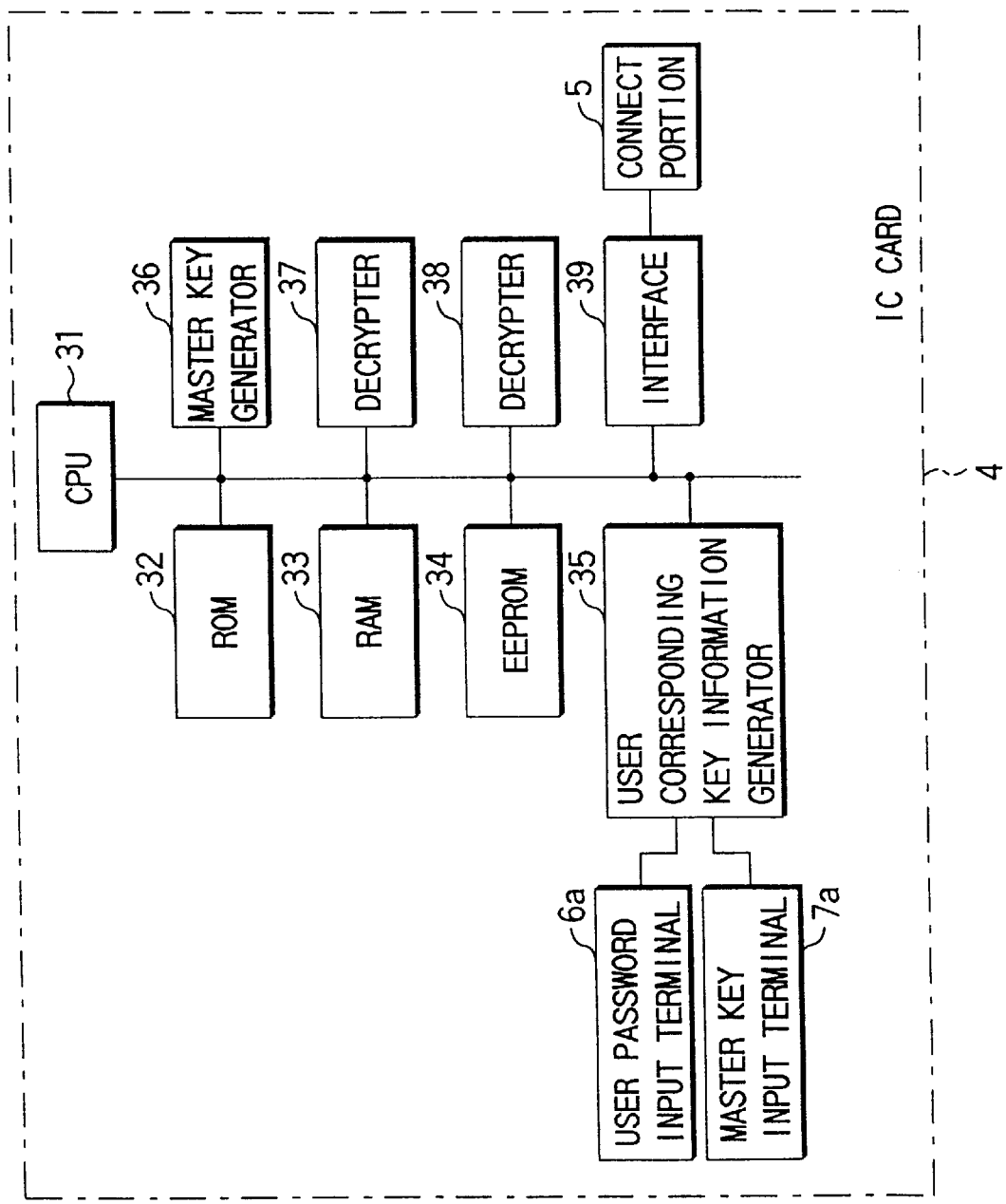
FIG. 9 is a schematic block diagram showing the arrangement of the IC card shown in FIG. 1.

As shown in FIG. 9, the IC card 4 comprises a CPU 31 for controlling the entire IC card 4, a ROM 32 that records control programs, a RAM 33 for data recording, the EEPROM 34 for recording user corresponding key information, user password, user ID, and the like, a user corresponding key information generator 35 for generating user corresponding key information, a master key generator 36 for generating master key information, a decrypter 37 for decrypting the encrypted key information 41 using the master key information to obtain key information, a decrypter 38 for decrypting the encrypted information 40 using the key information to obtain raw information, an interface 39, the connect portion 5, the user password input terminal 6a at which the user password is input, and the master key input terminal 7a at which the master key information is input.

The IC card 4 is provided to each user as an authentication IC card to prevent breaches of security, and incorporates all the decryption circuits. With this system, neither master key information nor key information ever go out of an IC, thus preventing illicit acts by a hacker. Hence, in the information transmission system shown in FIG. 1, the IC card 4 that incorporates the decryption circuits serves as a decipher device, and corresponds to a decipher unit when viewed from the entire information transmission system.

The user corresponding key information generator 35 comprises an operator for operating an exclusive OR, and exclusively ORs the user password input from the user password input terminal 6a and the master key information input from the master key input terminal 7a to generate user corresponding key information as the operation result.

For example, the generator 35 generates user corresponding key information "1001" by exclusively ORing user password "1100" and master key information "1010".

The master key generator 36 comprises an operator for operating an exclusive OR, and exclusively ORs the user corresponding key information read out from the EEPROM 34 and an externally supplied user password to generate master key information as the operation result.

For example, the generator 36 generates master key information "1010" by exclusively ORing user corresponding key information "1001" and user password "1100".

Each of the decrypters 37 and 38 comprises a random number generator made up of seven shift registers 60a to 60g and three operators 61a to 61c for operating exclusive ORs, as shown in FIG. 8. With this arrangement, each decrypter operates information loaded in the shift registers 60a to 60g on the basis of the information successively supplied to the operator 61c.

In case of the decrypter 37, for example, when master key information "110100000110" as a random number is supplied to the shift registers 60a to 60g, and encrypted key information "1000011100101" is supplied to the operator 61c, the operator 61c outputs key information "1010010001011" as decrypted information, i.e., the decryption result.

In case of the decrypter 38, for example, when key information "1010010001011" as a random number is supplied to the shift registers 60a to 60g, and encrypted information "1011100000101" is supplied to the operator 61c, the operator 61c outputs raw information "1110001110001" as decrypted information, i.e., the decryption result.

Figure 10:
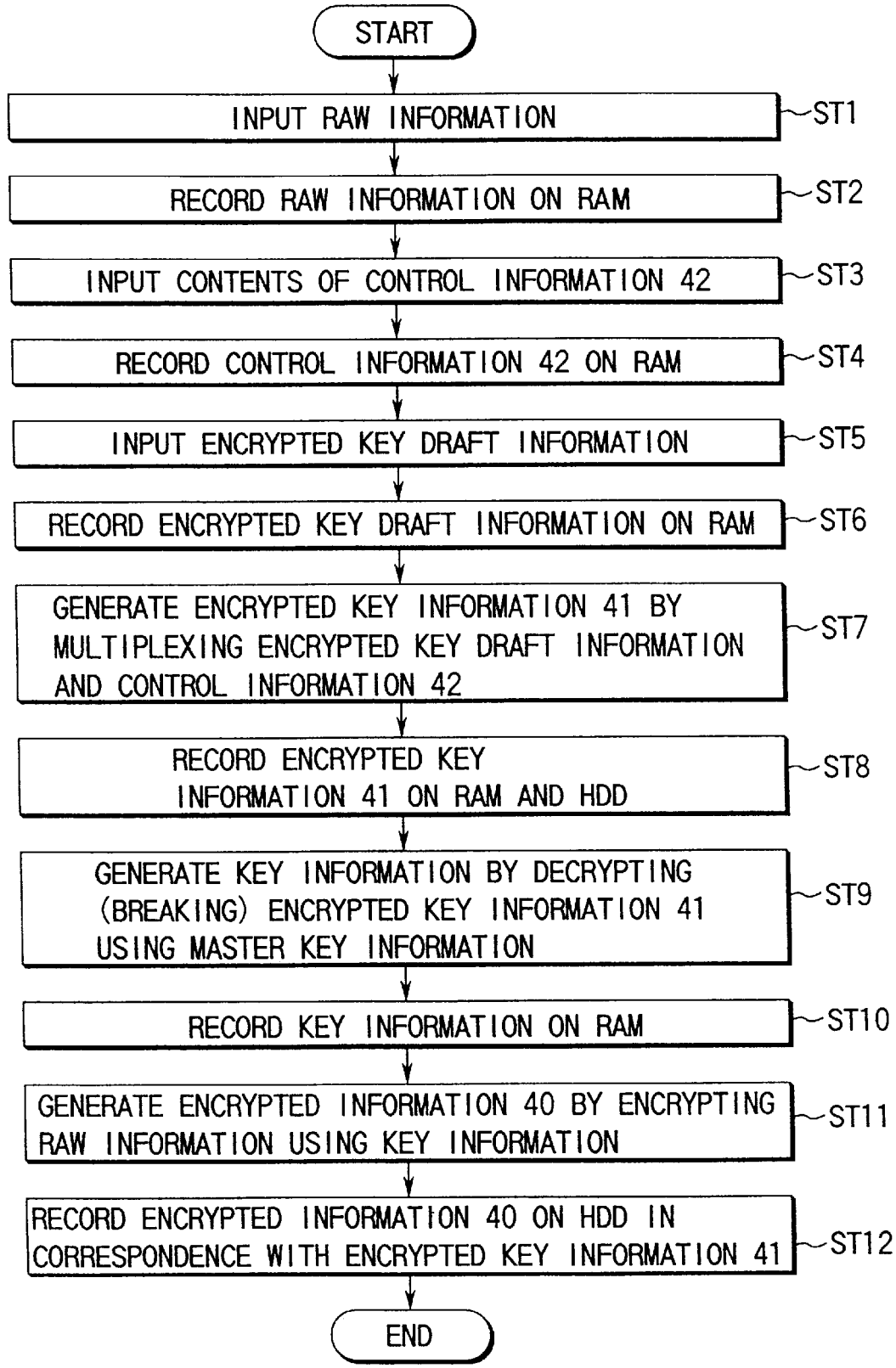
FIG. 10 is a flow chart for explaining the recording method of service information.
Figure 11:
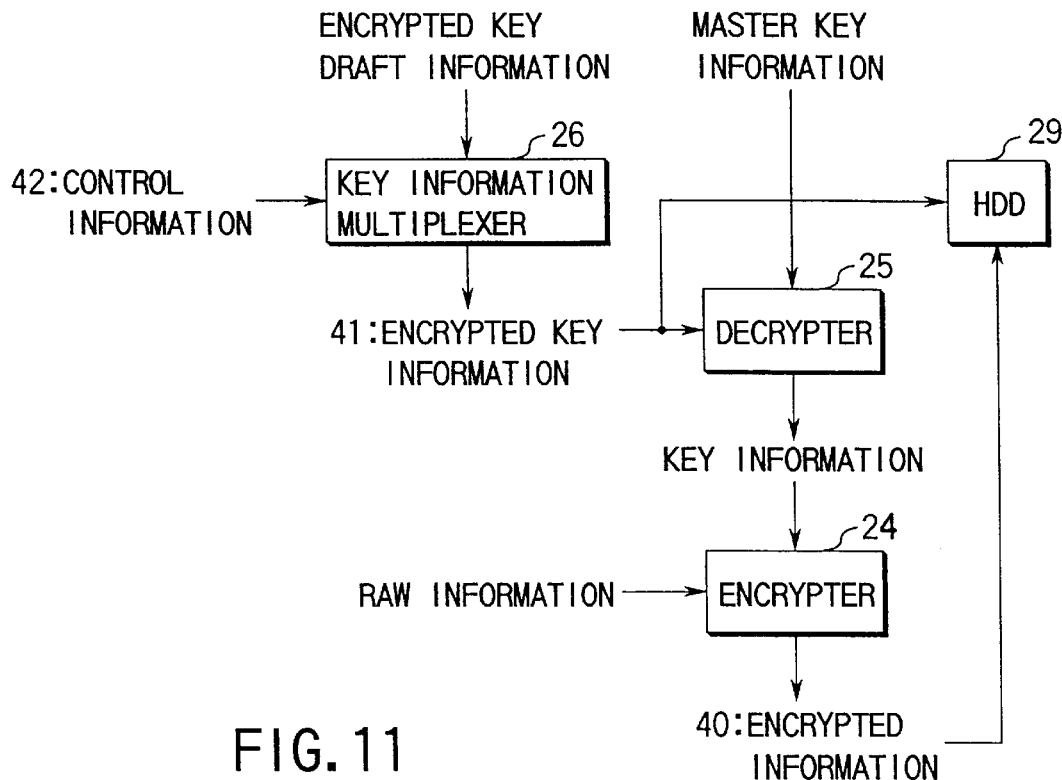
FIG. 11 is a chart showing the generation process of encrypted key information and encrypted information.

A method of recording the above-mentioned service information (to be provided to the user) onto the hard disk device (HDD) 29 by the host server 3 will be described below with reference to the flow chart shown in FIG. 10 and FIG. 11 that shows the generation process of the encrypted key information 41 and the encrypted information 40.

For example, the provider (who provides the service information to the users) of the host server 3 inputs raw information as a small-unit functional program for an application described in, e.g., a programming language (JAVA) (ST1) using a user interface including the CRT display 27 and keyboard 28.

This raw information is recorded on the RAM 22 by the CPU 20 (ST2).

Furthermore, the provider of the host server 3 inputs the contents of the above-mentioned control information 42 including the copy grant code 43 and the like, as shown in FIG. 7, using the user interface (ST3). This control information 42 is recorded on the RAM 22 by the CPU 20 (ST4).

The provider of the host server 3 inputs encrypted key draft information as a temporary encrypted key using the user interface (ST5). The encrypted key draft information is recorded on the RAM 22 by the CPU 20 (ST6).

The CPU 20 reads out the encrypted key draft information and control information 42 recorded on the RAM 22, and outputs them to the key information multiplexer 26, which mixes the encrypted key draft information and control information 42 to generate the encrypted key information 41 (ST7). Subsequently, the CPU 20 records the generated encrypted key information 41 on the RAM 22, and also the hard disk device (HDD) 29 (ST8).

The CPU 20 reads out the generated encrypted key information 41 recorded on the RAM 22, and master key information recorded on the EEPROM 23, and outputs them to the decrypter 25, which decrypts (breaks) the encrypted key information 41 using the master key information to generate key information (ST9). The CPU 20 then records the generated key information on the RAM 22 (ST10).

The CPU 20 reads out raw information recorded on the RAM 22 and the generated key information, and outputs them to the encrypter 24, which encrypts the raw information using the key information, thus generating the encrypted information 40 (ST11).

Finally, the CPU 20 records the generated encrypted information 40 on the hard disk device (HDD) 29 in correspondence with the encrypted key information 41 (ST12).

In this case, the encrypted key information 41 is generated first, and after that, the key information is supplied by supply the encrypted key information to the decrypter. Using the generated key information, the encrypter generates the encrypted information 40 as service information to be provided to the user, and the generated encrypted information 40 is recorded on the HDD 29 together with the encrypted key information 40.

Figure 12:
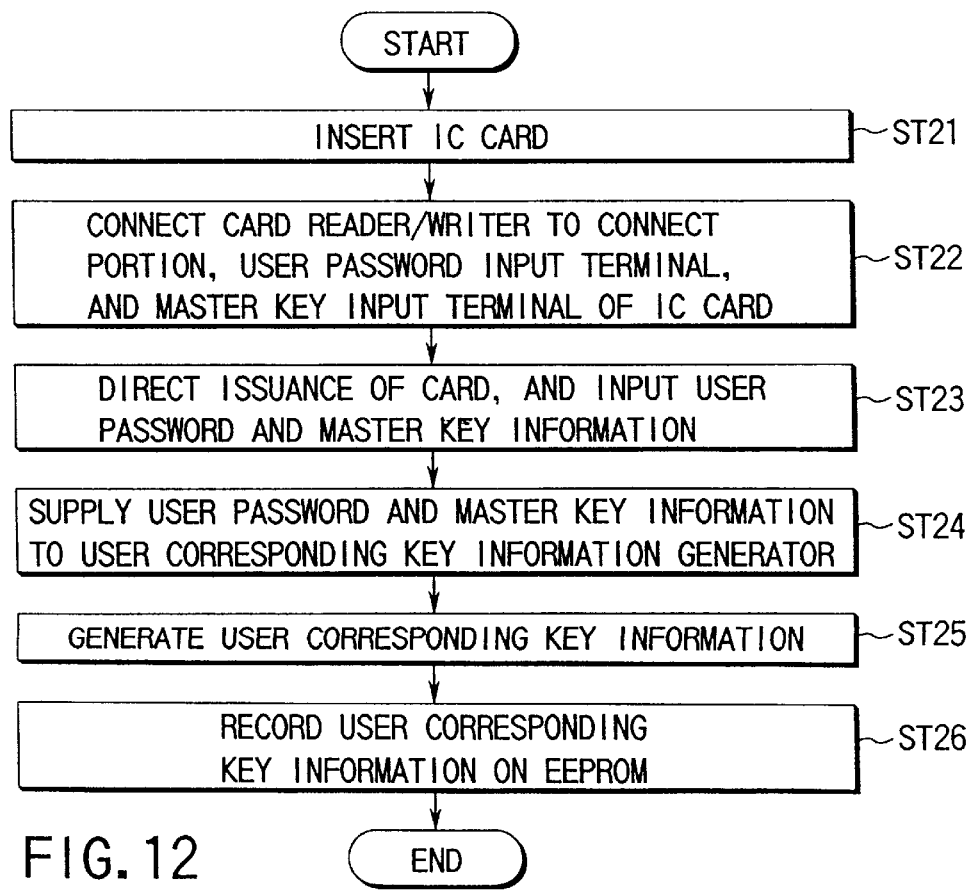
FIG. 12 is a flow chart for explaining the registration method of user corresponding key information into the IC card.

Issuance of the IC card 4 by the information service provider, i.e., the method of registering the user corresponding information into the IC card 4 will be explained below with reference to the flow chart shown in FIG. 12. Basically, the information service provider sets the IC card 4 before the IC card 4 is delivered to the user.

An issuance machine that issues the IC card 4 comprises a card reader/writer which can exchange data with the IC card 4 via its connect portion 5, and can input data via the user password input terminal 6a and master key input terminal 7a, a user interface including a display unit and input unit, and a control unit for controlling the issuance.

More specifically, the information service provider inserts an IC card 4 on which nothing is recorded into the issuance machine (ST21). Upon card insertion, the card reader/writer of the issuance machine is connected to the connect portion 5, user password input terminal 6a, and master key input terminal 7a of the IC card 4 (ST22).

Furthermore, the information service provider directs issuance of an IC card, and inputs a password determined by the information service provider upon contract with the user, and master key information that only the information service provider knows, using the user interface (ST23). The user password and master key information are supplied to the user corresponding key information generator 35 via the IC card reader/writer 13, user password input terminal 6a, master key input terminal 7a (ST24). The user corresponding key information generator 35 exclusively ORs the input information in units of bits to generate generated information to the EEPROM 34 (ST25). The user corresponding key information is then recorded on the EEPROM 34 (ST26).

After the user corresponding key information is recorded, the information service provider inputs the user password and user ID determined upon contract with the user. The CPU 10 outputs the user password and user ID to the CPU 31 via the IC card reader/writer 13, connect portion 5, and user interface 39. The CPU 31 records the received user password and user ID on the EEPROM 34.

After the corresponding key information and the like are recorded, the issuance machine issues the IC card 4. The provider fills up the user password input terminal hole 6 and master key input terminal hole 7 of the issued IC card 4 with, e.g., a resin. In this manner, an external input route to the user corresponding key information generator 35 can be cut off, and the user corresponding key information can never be changed later, i.e., can be prevented from being illicitly altered.

The processing for transmitting a transfer request for a program such as wordprocessing software to the host server 3 by startup processing at the client machine 1, breaking encrypted information obtained in response to the request using the IC card 4, and setting the decrypted information as a functional program will be explained below with reference to the flow chart shown in FIG. 13.

The power switch (not shown) of the client machine 1 is turned on to start up the client machine (ST31). The client machine 1 communicates with the host server 3 to confirm if there is wanted data in a specific group (charging system or the like) (ST32). For example, a request for a program such as wordprocessing software as an information service is generated. When this confirmation (request) is directed, the CPU 10 displays a guidance for insertion of an IC card 4 that can download (break) the data on the display unit 14 (ST33). In accordance with this guidance, the user inserts the corresponding IC card 4 (ST34).

The CPU 10 then displays a guidance for input of the user ID and user password on the display unit 14 (ST35). In accordance with this guidance, the user inputs the user ID and user password (ST36).

The CPU 10 supplies the input user ID and user password to the CPU 31 in the IC card 4 via the IC card reader/writer 13, connect portion 5, and interface 39 (ST37). The CPU 31 compares the supplied user ID and user password with those recorded in advance on the EEPROM 23 to check if they coincide with each other (ST38). If a coincidence is determined, the CPU 31 informs the client machine 1 of the user ID (ST39); otherwise, the CPU 31 determines an unauthorized user, stops operation, and informs the client machine 1 of an NG signal (ST40).

Upon determining the coincidence in step 38, parallel to the processing in step 39, the CPU 31 exclusively ORs the user password and the user corresponding key information recorded in advance on the EEPROM 34 using the master key generator 36 to generate master key information as the operation result, and records it on the RAM 33 (ST41).

The client machine 1 that received the user ID in step 39 adds an IP address of the client machine 1 to an information service request based on the request for the program such as wordprocessing software as the information service issued by the user and the user ID received from the IC card 4, and transmits them to the host server 3 (ST42). In response to the transfer request, the host server 3 authenticates the user ID. After that, the host server 3 forms a communication packet which includes the program (encrypted information) such as wordprocessing software as the information service, which is encrypted and recorded on the hard disk device (HDD) 29, the encrypted key information 41 (encrypted information for decryption) corresponding to that encrypted information, and an IP address with the source and destination addresses, and sends back the packet to the client machine 1 that issued the transfer request (ST43). In this case, the contents of charge for the user corresponding to the user ID for transmission of the information service are recorded on a recording unit (not shown).

Upon reception of the sent-back packet, the client machine 1 decrypts (breaks) the encrypted information 40 by the encrypted key information 41 and the control information 42 in the encrypted key information 41 using the IC card 4 (ST44), and allows the user to perform processing using the decrypted program such as wordprocessing software (ST45).

Decryption of the encrypted information 40 will be described below with reference to the flow chart shown in FIG. 14.

More specifically, the CPU 10 of the client machine 1 checks the region code of a region where the host server 3 is installed on the basis of the IP address in the received communication packet, generates client machine generated information including the source IP address and the checked region code and added with "1H" as the value of the drive code 44 if the communication line 2 is a 10-MHz LAN network, and sends it to the IC card 4 (ST51).

The CPU 31 of the IC card 4 records the received client machine generated information on the RAM 33 (ST52).

Parallel to supply of that information, the CPU 31 exclusively ORs the user password for which the coincidence has been determined, and the user corresponding key information recorded in advance on the EEPROM 34 using the master key generator 36 to generate master key information as the operation result, and records it on the RAM 33 (ST53).

After the above-mentioned preparation has been done, the CPU 31 of the IC card 4 transmits a transmission request for the copy grant code 43 to the CPU 10 of the client machine 1 (ST54). In response to this transmission request, the CPU 10 of the client machine 1 extracts the copy grant code 43 from the control information 42 encapsulated in the encrypted key information 41, and transmits it to the CPU 31 of the IC card 4 (ST55).

The CPU 31 of the IC card 4 checks if the copy grant code 43 is "1" or "0" to determine whether copying is granted (ST56).

If it is determined that copying is granted, the CPU 31 unconditionally accepts the encrypted information 40 and the like independently of its source even when they are copied on the HDD 16 or a disk of the optical disk device 17, and advances to step 61 to execute decryption.

On the other hand, if it is determined in step 56 that copying is denied, since the source of the encrypted information 40 and the like must be confirmed, the CPU 31 transmits a transmission request for the drive code 44, address code 45, and region code 46 to the CPU 10 of the client machine 1 (ST57). In response to this transmission request, the CPU 10 of the client machine 1 extracts the drive code 44, address code 45, and region code 46 from the control information 42 encapsulated in the encrypted key information 41, and transmits them to the CPU 31 of the IC card 4 (ST58).

The CPU 31 of the IC card 4 checks if the drive code 44, address code 45, and region code 46 supplied from the client machine 1 coincide with the client machine generated information recorded on the RAM 33 (ST59).

More specifically, if the source of the encrypted information and the like is a 10-MHz ISDN, the drive code in the client machine generated information is "1H", and coincides with "1H" of the drive code 44 in the control information 42, thus determining the source of the encrypted information and the like as an authentic one.

On the other hand, if the encrypted information and the like is a reconstruction from the HDD 16, the drive code in the client machine generated information is "CH", and does not coincide with "1H" of the drive code 44 in the control information 42, thus determining the source of the encrypted information and the like as an unauthorized one, i.e., illicitly copied information.

Also, whether or not the source IP address in the client machine generated information coincides with the address code 45 in the control information 42 is checked to determine if the encrypted information and the like are original ones or illicitly copied ones for commercial use as a pirated edition.

If a non-coincidence is determined in step 59, the CPU-31 determines an unauthorized user, stops operation, and informs the client machine 1 of an NG signal (ST60).

On the other hand, if a coincidence is determined in step 59 (i.e., if it is determined that the encrypted information and the like are original ones), or if it is determined in step 56 that copying is granted, the CPU 31 grants decryption and determines decryption start. Then, the CPU 31 transmits a transmission request for the encrypted key information 41 to the CPU 10 of the client machine 1 (ST61). In response to this transmission request, the CPU 10 of the client machine 1 transmits the encrypted key information 41 to the IC card 4 (ST62).

The CPU 31 of the IC card 4 directs the decrypter 37 to decrypt (break) the encrypted key information 41 supplied from the client machine 1 using the master key information recorded on the RAM 33 to generate key information, and records it on the RAM 33 (ST63).

Subsequently, the CPU 31 transmits a transmission request for the encrypted information 40 to the CPU 10 of the client machine 1 (ST64). In response to this transmission request, the CPU 10 of the client machine 1 transmits the encrypted information 40 to the IC card 4 (ST65).

The CPU 31 of the IC card 4 instructs the decrypter 38 to decrypt (break) the encrypted information 40 supplied from the client machine 1 using the key information recorded on the RAM 33 to generate raw information, and transmits it to the client machine 1 (ST66).

Upon reception of the raw information, the CPU 10 of the client machine 1 records the program such as wordprocessing software as the received raw information on the RAM 22 (ST67). As a result, the user can perform processing using the program such as wordprocessing software recorded on the RAM 22 at the client machine 1.

As described above, the master key generator can generate the master key information as a common key using the user password in the IC card 4, i.e., in a place not accessible by the user.

The user corresponding key information is recorded in advance on the EEPROM, and the master key generator generates master key information as a common key on the basis of the user corresponding key information and the password input by the user. Using the generated master key information, the decrypter can decrypt the encrypted information.

As described above, since the host server need not encrypt information upon receipt of each user's request, low-cost information delivery can be realized.

Illicitly copied information can be very easily found, thus greatly improving security.

In the technical view of encryption, as compared to the conventional hybrid system that encrypts data itself using a common key, and encrypts the common key alone using a public key again, two common keys are issued, one common key is encrypted and is transmitted (transfer of the encrypted common key) together with the encrypted data, and the other common key is decrypted inside the IC card 4 using specific information input by the user. For this reason, the common key is exposed neither in the middle of the transmission path nor to the user himself or herself.

Hence, not only the following remarkable improvements can be obtained as compared to the shortcomings of the common key scheme:

1. A key is unlikely to be illicitly copied by a third party during its transfer.
2. The key can be easily managed (the user need only have only one IC card).
3. The destination user can hardly alter encrypted data.

But also as compared to the asymmetric scheme:

4. Both the information service provider and user can readily encrypt/decrypt within a relatively short period of time.
5. Since the information service provider need only set a master key alone, and need not inquire public keys of a management center in units of users, the information provision efficiency to the users can be markedly improved.
6. The information service provider can record encrypted information in advance on an IC card, and can deliver the IC card directly. For this reason, as compared to conventional encryption that encrypts information in response to each user's request and delivers the encrypted information, the load on the information service provider can be greatly lightened.
7. Preparation for decryption can be done by only a conventional authentication procedure using an IC card, i.e., by inputting a user's password for personal authentication. Hence, the encryption technique can be adopted without imposing any extra loads on the user to assure security.
8. Since control information of encrypted information includes device information and region information, the user cannot copy the encrypted information to an HDD or optical disk and cannot illicitly use it.

Consequently, all the shortcomings of the conventional encryption technique can be removed, processing at both the information source and destination can be greatly simplified, and the security function can be enhanced.

The second embodiment will be described below. In this embodiment, information (see FIG. 2) consisting of encrypted information 40 and encrypted key information 41 containing control information 42 like that recorded on the recording unit (HDD 29) of the host server 3 in the first embodiment is recorded on an optical disk 17a such as a DVD-ROM or the like, and is loaded into the optical disk device (ROM drive) 17 of the client machine 1 of the first embodiment so as to reproduce information.

In this case, "FH" indicating the DVD-ROM is described as a drive code in the control information, and the manufacturing date indicating the time of creation of a master disk of an optical disk is described as time information.

More specifically, in place of transmitting the communication packet formed by the encrypted information 40, the encrypted key information 41 containing the control information 42, and the IP address from the host server in the first embodiment, the encrypted information 40, the encrypted key information 41 containing the control information 42 are reproduced from the DVD-ROM 17a loaded in the optical disk device 17. The subsequent operations are done in substantially the same manner as in the flow charts shown in FIGS. 13 and 14, except that the drive code in the client machine generated information is "FH", and only when it coincides with "FH" of the drive code 44 in the control information 42, it is determined that the encrypted information and the like are obtained from an authorized source.

Information such as video data and the like may be recorded as the encrypted information to be recorded on the optical disk (DVD-ROM) 17a, in addition to the program and the like.

Figure 13:
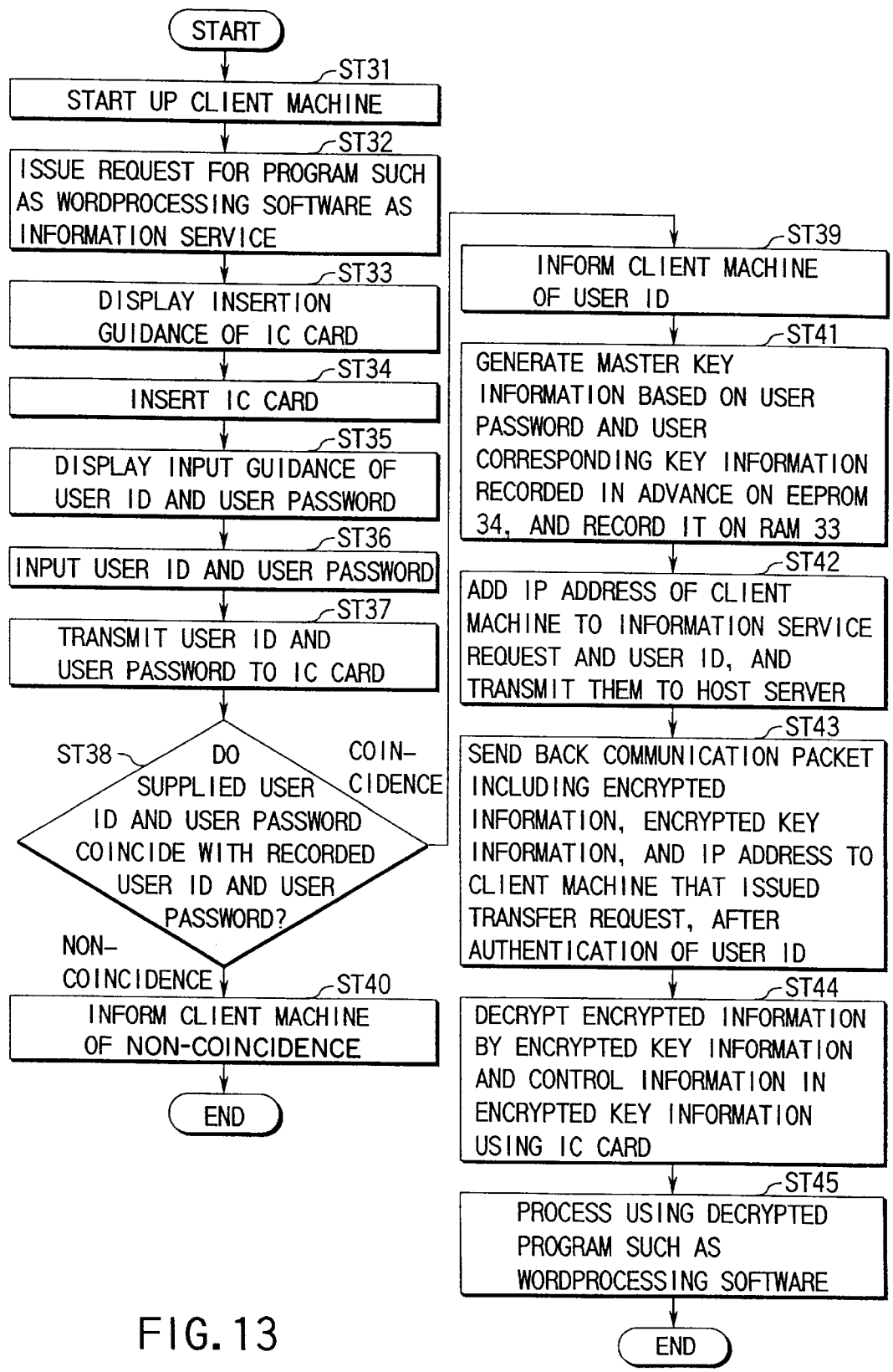
FIG. 13 is a flow chart for explaining the processing for decrypting the encrypted information obtained in response to a request by the IC card and setting the decrypted information as a functional program.
Figure 14:
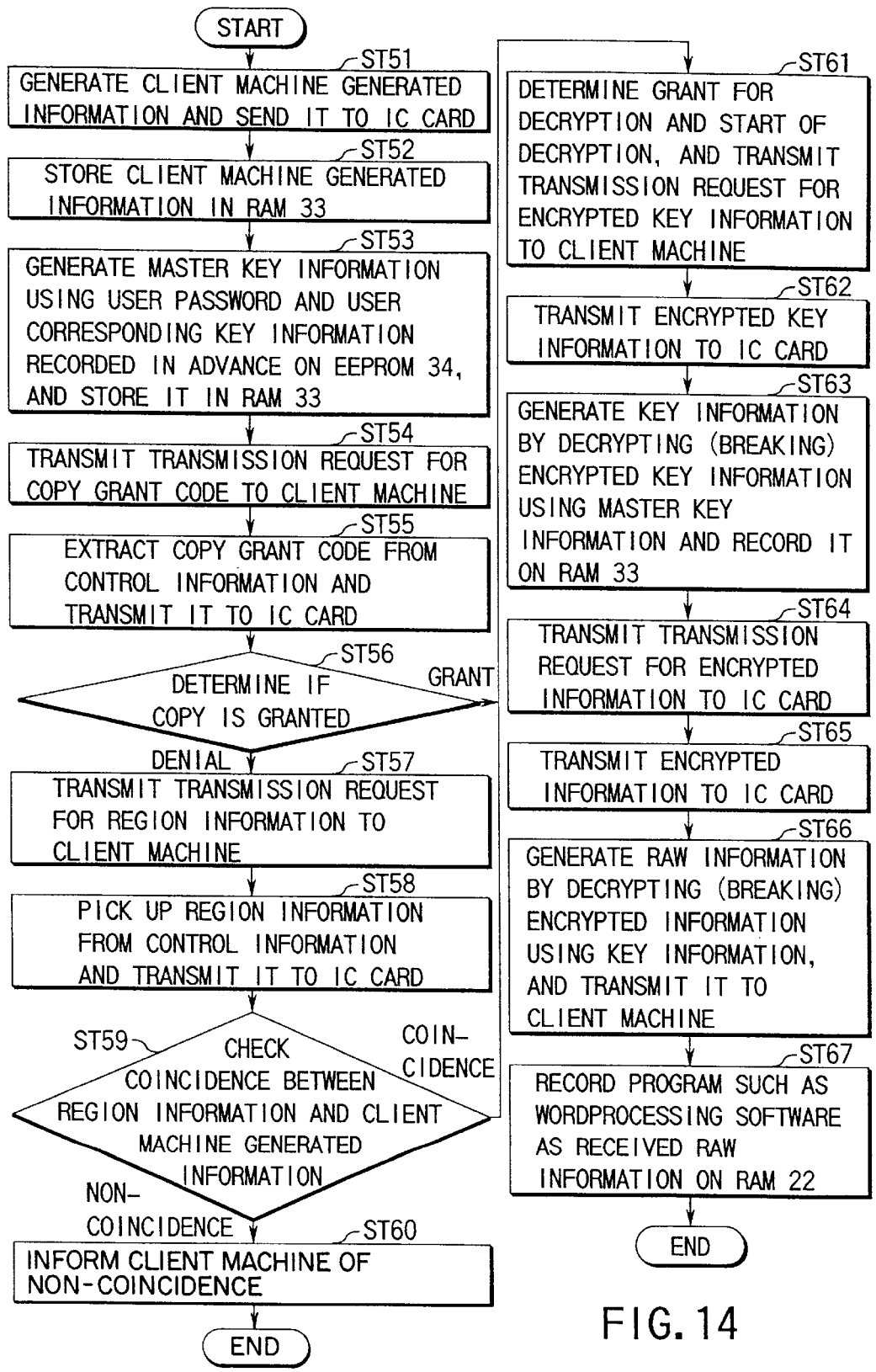
FIG. 14 is a flow chart for explaining decryption processing of encrypted information.

Of the operations shown in FIGS. 13 and 14, processing portion (step 53) associated with the user password may be omitted. In this case, the EEPROM 34 of the IC card 4 records in advance master key information in place of the user corresponding key information.

As will be described in detail below, the optical disk (DVD-ROM) 17a is prepared by recording the encrypted information 40 and the encrypted key information 41 containing the control information 42 onto a master disk 70 used in the manufacture of the optical disk (DVD-ROM) 17a in the same manner as in the recording method of such information described above with reference to FIGS. 10 to 12 in the first embodiment.

The method of manufacturing the optical disk (DVD-ROM) 17a will be explained below with reference to FIGS. 15A to 15K.

Figure 15A:
FIGS. 15A to 15K are sectional views for explaining the method of manufacturing a DVD-ROM.
Figure 15B:
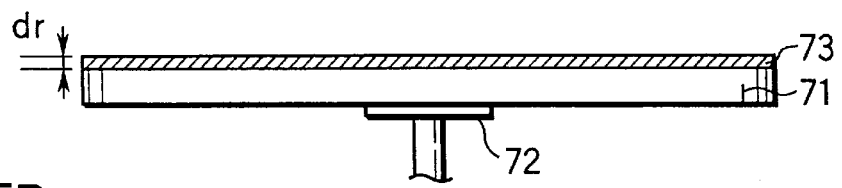

A glass plate 71 formed of reinforced glass having a thickness of 0.5 to 30 mm to guarantee high surface precision is placed on a spindle motor 72 (FIG. 15A), and is rotated at a specific rotational speed. A photoresist solution dissolved in an organic solvent is applied onto the rotating plate, and is uniformly spread by utilizing the centrifugal force upon rotation of the glass plate 71. This coating method is generally called spinner coating. After that, the glass plate 71 is left to stand in a high-temperature environment ranging from 60 to 300° C. to evaporate the organic solvent, thus forming a photoresist layer 73 with a uniform thickness dr (FIG. 15B).

Although the transfer efficiency normally drops in the processes shown in FIGS. 15F to 15I to be described later, if the transfer efficiency of 100% is maintained throughout the processes, the thickness dr of the photoresist layer 73 becomes the pit depth or pre-groove depth on a recording film 84 of a final information recording medium.

Figure 15C:
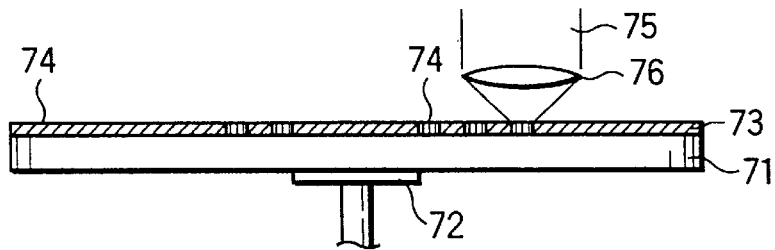
Figure 15D:
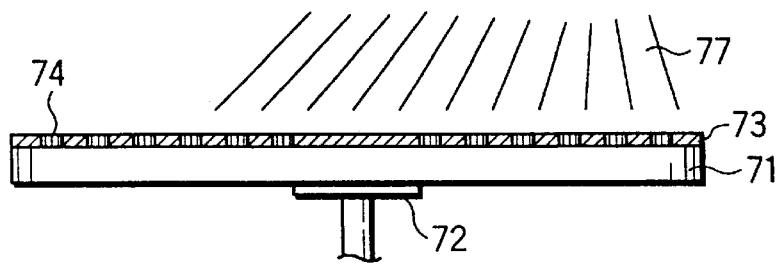

A laser beam 75 is focused by an objective lens 76 of a master disk recording apparatus (to be described later) and is intermittently irradiated onto the photoresist layer 73 so as to form exposed portions 74 by exposure (FIG. 15C). Upon completion of exposure over the entire perimeter, the glass plate 71 is detached from the master disk recording apparatus, and a developing solution 77 is applied for a specific period of time while rotating the glass plate 71, as shown in FIG. 15D.

Figure 15E:
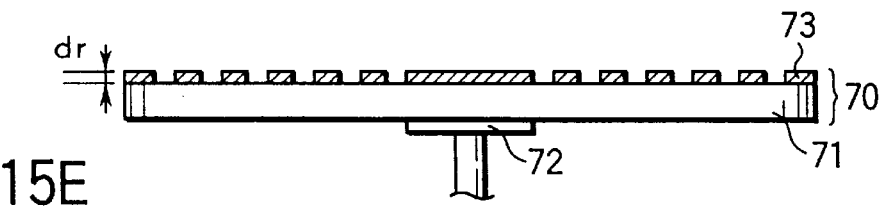
Figure 15F:
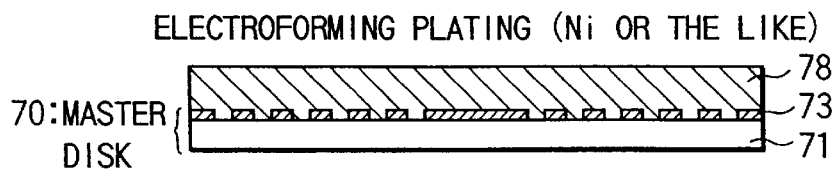
Figure 15G:
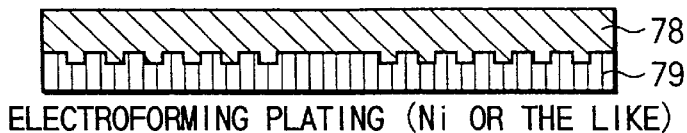
Figure 15H:
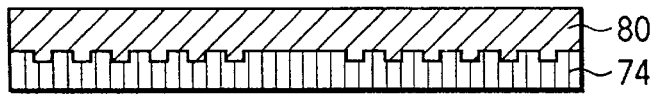

As a result, the exposed portions 74 dissolve and are removed, as shown in FIG. 15E, thus forming small grooves (ridges) with the depth dr. The formed glass plate 71 and photoresist layer 73 are called a master disk 70 of an optical disk. The formed master disk 70 is detached from the spindle motor 72, and a replica of the three-dimensional pattern of the master disk 70 is formed by electroless plating using Ni and electrolytic plating (electroforming). As shown in FIG. 15F, the formed replica is called a master plate 78. Upon completion of formation of the master plate 78, the structure, i.e., the master disk 70 and the master plate 78 are dipped into an organic solvent such as acetone to dissolve the photoresist layer 73, thus peeling the master plate 78 from the master disk 70. After that, a mother plate 79 is formed based on the master plate 78 by electrolytic plating (electroforming) (FIG. 15G), and the mother plate 79 is then stripped from the master plate 78. Placing the mother plate 79 back in position, a stamper 80 is formed by electrolytic plating (electroforming) (FIG. 15H).

Figure 15I:
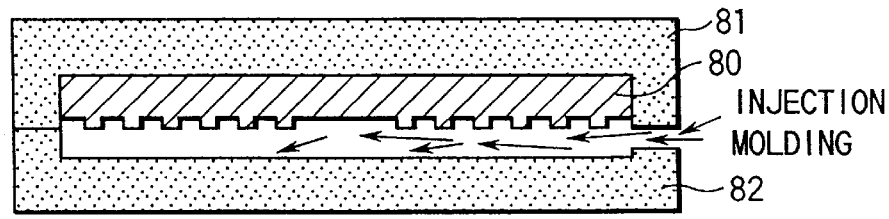

In general, a transparent plastic substrate 83 for an information recording medium is formed by a method called "injection molding". More specifically, molds A 81 and B 82 are set, as shown in FIG. 15I, and a high-temperature molten resin material (polycarbonate, PMMA, ABS, or the like is normally used) is filled in the gap between these molds. Since the stamper 80 formed in the previous process is attached to the mold A 81, the small three-dimensional pattern on the stamper 80 is transferred to the resin material when the resin material is filled. After that, the molds A 81 and B 82, and the resin material are left to stand to cool the resin material to ordinary temperature together with these molds. After the resin material is cooled and solidifies, a plastic substrate 83 (the cooled and solidified resin material transferred with the three-dimensional pattern is called a "plastic substrate 83") is released by opening the molds A 81 and B 82.

Figure 15J:
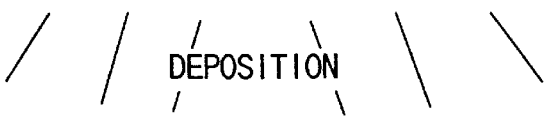
Figure 15K:

The obtained plastic substrate 83 is placed in vacuum, and a recording film 84 is formed on the plastic substrate 83 by deposition such as sputtering, vacuum deposition, ion plating, or the like, thus forming a structure shown in FIG. 15J. Two such structures are set so that their recording films 84 and 86 face each other, and an adhesive film 85 is filled into a gap therebetween, thus completing an information recording medium shown in FIG. 15K.

Figure 16:
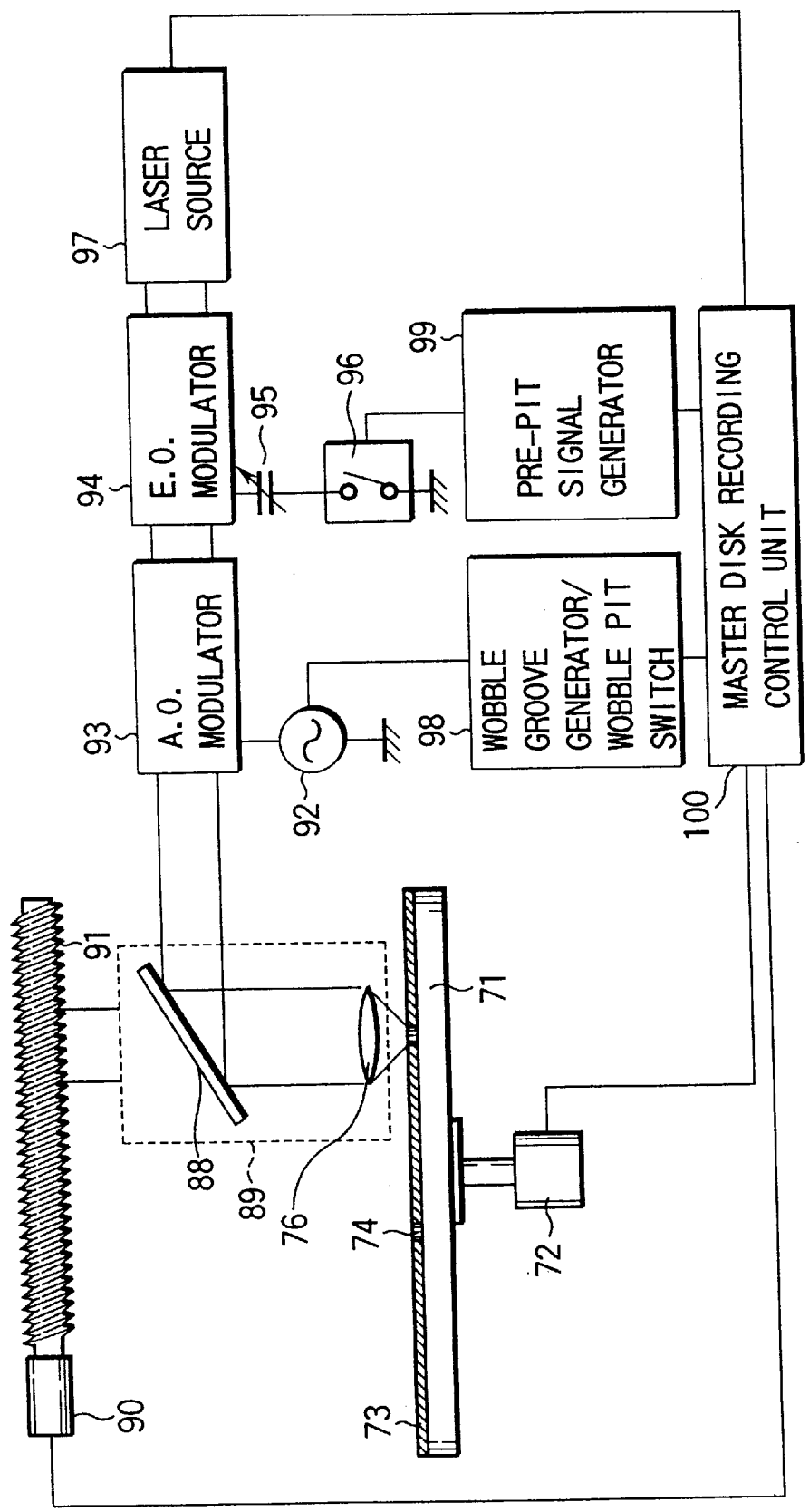
FIG. 16 is a schematic diagram for explaining the arrangement of a master disk recording apparatus.

FIG. 16 shows the structure of the master disk recording apparatus for locally exposing the photoresist layer 73 shown in FIG. 15C. As described above, the glass plate 71 is rotated on the spindle motor 72 at a specific rotational speed. The laser beam 75 is reflected by a return mirror 88, and is focused on the photoresist layer 73 via the objective lens 76. The return mirror 88 and objective lens 76 move together as a movable portion 89 in the radial direction of the glass plate 71. The movable portion 89 is driven to move by a feed motor 90 and a feed gear 91. The movable portion 89 has a monitor portion (not shown) for optically monitoring the focused spot position on the glass plate 71, and the rotational speed of the spindle motor 72 changes in correspondence with the monitor output. In this way, a master disk recording control unit 50 controls the relative moving speed (linear velocity) of the focused spot on the glass plate 71 to become constant.

The laser beam 75 emitted by a laser source 97 passes through an E.O. modulator 94 and A.O. modulator 93, and then reaches the return mirror 88. A pre-pit signal representing a small, three-dimensional pit pattern turns on/off a high-speed switch 96 in accordance with a signal supplied from a pre-pit signal generator 99, thus applying or releasing a voltage from a variable voltage generator 95 onto or from the E.O. modulator 94. By changing the voltage to be applied to the E.O. modulator 94, the amount of laser beam that passes through the E.O. modulator 94 changes. In this manner, the amount of laser beam that reaches the photoresist layer 73 is changed to form exposed portions 74 and non-exposed portions on the photoresist layer 73.

When a specific frequency oscillator 92 applies a voltage of specific frequency to the A.O. modulator 93, a standing wave having a specific spatial period (a compression wave among molecules in the A.O. modulator 93) in the A.O. modulator 93 is produced. With this standing wave, the laser beam 75 undergoes Bragg reflection, and is deflected in a specific direction. Hence, when the spatial period of the standing wave changes, the Bragg condition changes, and the deflection angle of the laser beam 75 changes accordingly. That is, upon changing the output frequency of the specific frequency oscillator 92, the traveling direction of the laser beam 75 changes, and as a consequence, the focal point position on the photoresist layer 73 moves radially.

In case of an information recording medium having wobble pre-grooves at a specific period, the frequency of the frequency oscillator 92 changes at a specific period in accordance with the output from a wobble groove generator/groove pit switch 98. In case of wobble pits, the frequency of the specific frequency oscillator 92 is changed to radially displace the focused spot on the photoresist layer 73 by half the track pitch (the pitch between lands and grooves).

As described above, the ROM drive 17 (client machine 1) that has no decryption means for decrypting encrypted information can solely determine whether or not information reproduction is granted. With this arrangement, when it is detected that information reproduction is inhibited, information which are inhibited from being reproduced and transferred can be inhibited from being transferred to an apparatus such as a personal computer that attempts to decrypt and reproduce the information.

In the conventional system, when the encrypted key includes control information, the ROM drive must have decryption means for decrypting the key information, resulting in high cost. Also, such ROM drive loses compatibility with conventional ones. However, the second embodiment can alleviate such shortcomings.

Figure 17:
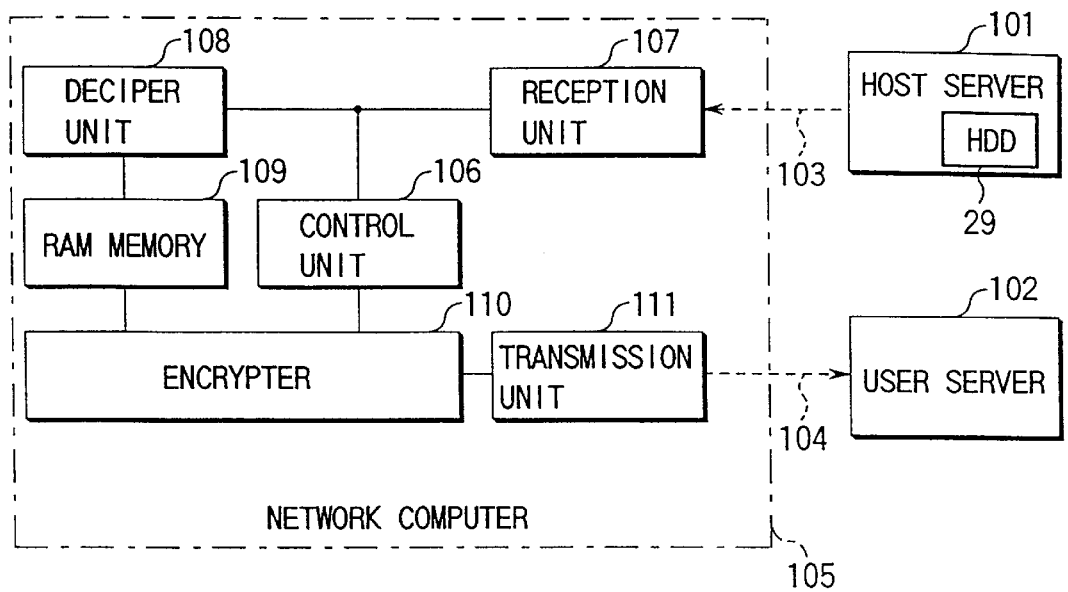
FIG. 17 is a schematic block diagram showing the arrangement of a network system to explain another embodiment.

Still another embodiment will be described below. This embodiment exemplifies a network system in which a host server 101 and user server 102 are connected to a network computer 105 via networks 103 and 104, respectively, as shown in FIG. 17.

For example, the host server 101 has the same arrangement as that of the host server 3 of the first embodiment, and has an HDD 29 which records information consisting of an encrypted program (information used by the user) 40 such as wordprocessing software as encrypted information, and encrypted key information 41 containing non-encrypted control information 42 and obtained by encrypting key information for decrypting (breaking) the encrypted information 40.

The network computer 105 comprises a control unit 106 for controlling the overall network computer 105, a reception unit 107 for receiving the encrypted information and the like from the host server 101, a decipher unit 108 for breaking codes such as the encrypted information and the like received at the reception unit 107, a RAM memory 109 for storing the information broken by the decipher unit 108, an encrypter 110 for encrypting the processing result of the control unit 106, and a transmission unit 111 for transmitting the processing result encrypted by the encrypter 110 to the user server 102 as information. The decipher unit 108 has the same arrangement and function as those of the IC card 4 of the first embodiment, and the encrypter 110 also has the same arrangement and function as those of the encrypter 24 of the first embodiment.

With this arrangement, encrypted information of a small-size functional program and the like described in JAVA or the like sent from the host server 101 via the network 102 is converted into an electrical signal by the reception unit 107, and the converted signal is directly input to the decipher unit 108. The decrypted functional program is input to the RAM memory 109. The control unit 106 executes arithmetic processing while reading out the functional program from the RAM memory 109. The result after the processing is encrypted by the encrypter 110, and the encrypted information is sent from the transmission unit 111 to the user server 102 via the network 103.

Since all the circuits except for the reception unit 107 and transmission unit 111 in the network computer 105 are realized by a single chip, a raw signal after decryption cannot be directly output outside the chip, thus improving the security function.

Figure 18:
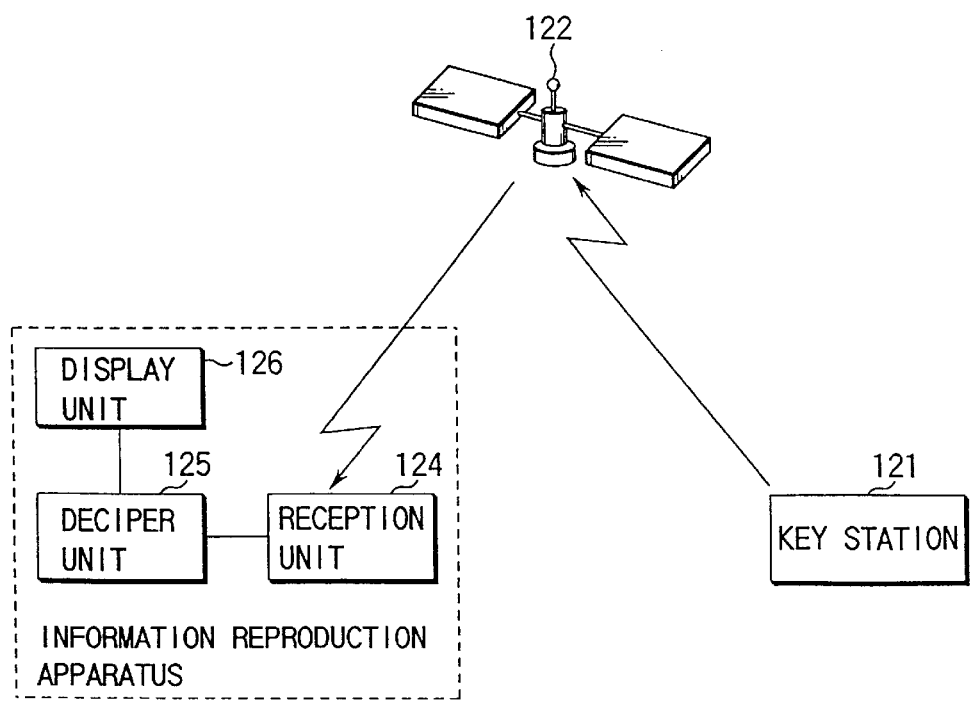
FIG. 18 is a diagram showing an example using a broadcast satellite to explain still another embodiment.

As still another embodiment, an example using a broadcast satellite will be described below with reference to FIG. 18.

More specifically, encrypted information and the like shown in FIG. 2 of the first embodiment are sent from a key station 121 via a broadcast satellite 122. A reception unit 124 in an information reproduction apparatus 123 converts the received information into an electrical signal, and the converted signal is decrypted by a decipher unit 125 formed by the IC card of the first embodiment to obtain a raw signal. The decrypted information is displayed on a display unit 126.

According to the above embodiments, information that requires security protection or copyright protection can be prevented from being illicitly copied.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalent.

What is claimed is:

1. A key information generating method executed by an encoder and a decoder, wherein the encoder includes first key information generating means for generating transmission-side key information that is used for encrypting the contents information and first memorizing means for memorizing the transmission-side key information, and the decoder includes second key information generating means for generating reception-side key information that is used for decrypting the encrypted contents information and second memorizing means for memorizing the reception-side key information, said method being used for generating the transmission-side key information by controlling the first key information generating means and the first memorizing means and for generating the reception-side key information by controlling the second key information generating means and the second memorizing means, said method comprising:

(A) controlling the first key information generating means and the first memorizing means, said controlling including:
   (Aa) generating first information on the basis of copy permission information which indicates whether or not contents information is permitted to be copied; and
   (Ab) generating second information as the transmission-side key information, on the basis of the first information, and (B) controlling the second key information generating means and the second memorizing means, said controlling including:
   (Ba) generating third information on the basis of the copy permission information; and
   (Bb) generating fourth information as the reception side key information on the basis of the third information.

* * * * *